United States Patent [19]

Baker, Jr.

[11] Patent Number: 4,891,901
[45] Date of Patent: Jan. 9, 1990

[54] FISHING LURE
[75] Inventor: James E. Baker, Jr., Greenwood, Mo.
[73] Assignee: Ronald Goldberg, Leawood, Kans.
[21] Appl. No.: 25,521
[22] Filed: Mar. 13, 1987
[51] Int. Cl.⁴ ............................................. A01K 85/00
[52] U.S. Cl. .................................. 43/42.11; 43/42.13
[58] Field of Search ................. 43/42.11, 42.12, 42.13, 43/42.14, 42.15, 42.52

[56] References Cited

U.S. PATENT DOCUMENTS

| | | | |
|---|---|---|---|
| 1,292,865 | 1/1919 | Olt | 43/42.14 |
| 2,236,023 | 3/1941 | Turner | 43/42.12 |
| 2,306,640 | 12/1942 | Nelson | 43/42.14 |
| 2,598,965 | 6/1952 | Bain | 43/42.11 |
| 2,603,022 | 7/1952 | Craig | 43/42.11 |
| 2,629,960 | 3/1953 | Baxter | 43/42.12 |
| 3,141,255 | 7/1964 | Randall | 43/42.11 |
| 3,257,750 | 6/1966 | Shannon | 43/42.13 |
| 3,260,011 | 7/1966 | Reamy | 43/42.12 |
| 3,439,443 | 4/1969 | Weimer | 43/42.14 |
| 4,209,932 | 7/1980 | Pate | 43/42.11 |
| 4,501,087 | 2/1985 | Blomquist | 43/42.51 |
| 4,619,068 | 10/1986 | Wotawa | 43/42.11 |

Primary Examiner—M. Jordan
Attorney, Agent, or Firm—Senniger, Powers, Leavitt and Roedel

[57] ABSTRACT

A novel spinner blade for use in spinner bait, buzz bait and crank bait lures. The blade comprises upstream and downstream ends connected by an intermediate spiral body section. Swivels connect the blade to the fishing line and hook so that the blade rotates in a straight-line action during line retrieval without the need of a fixed wire or shaft. Various lures are disclosed which utilize the novel blade design so as to present fish-attracting stimuli during lure retrieval.

48 Claims, 9 Drawing Sheets

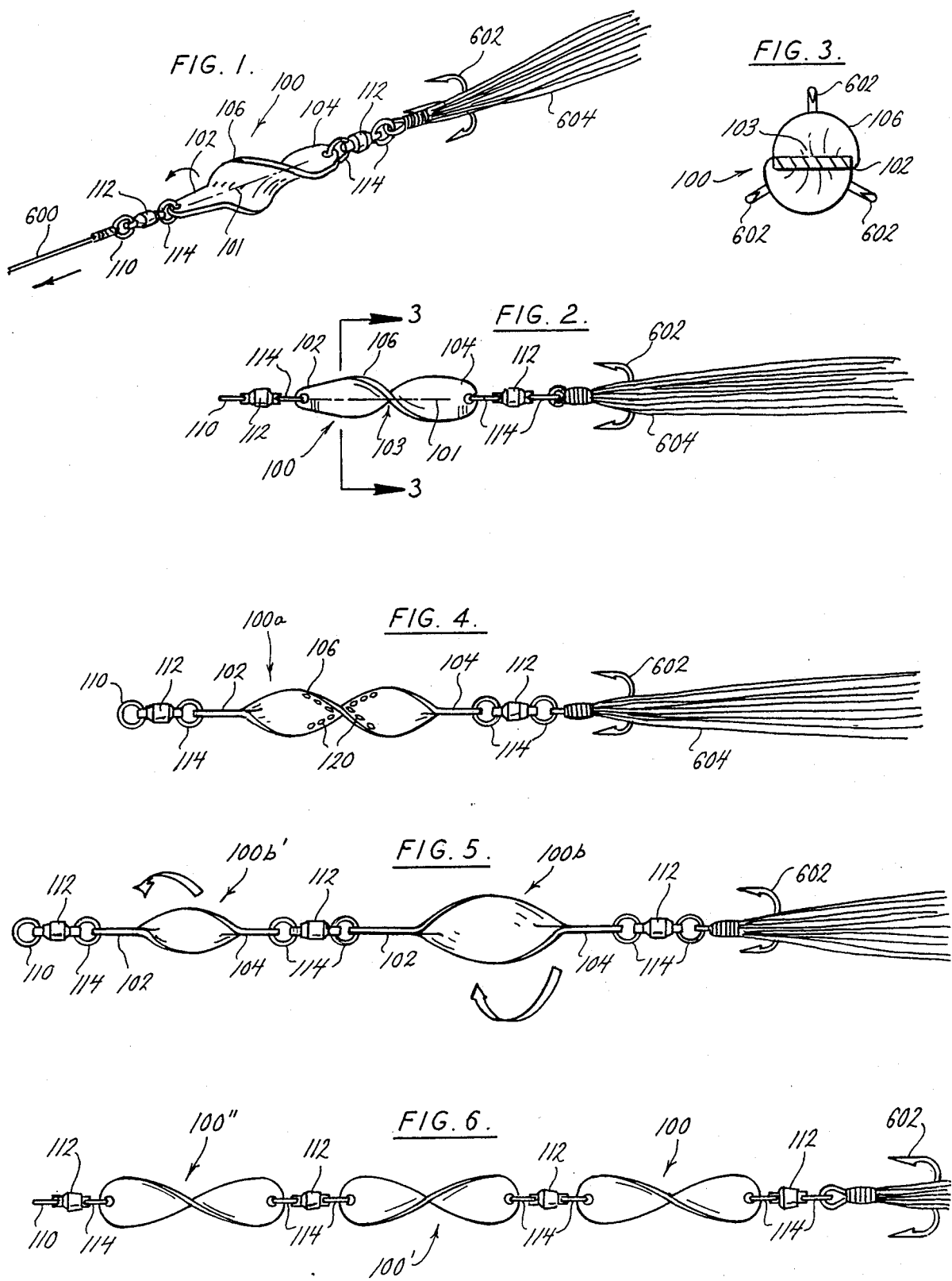

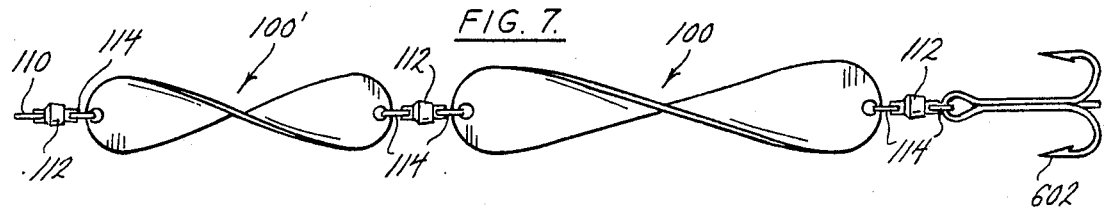
FIG. 7.
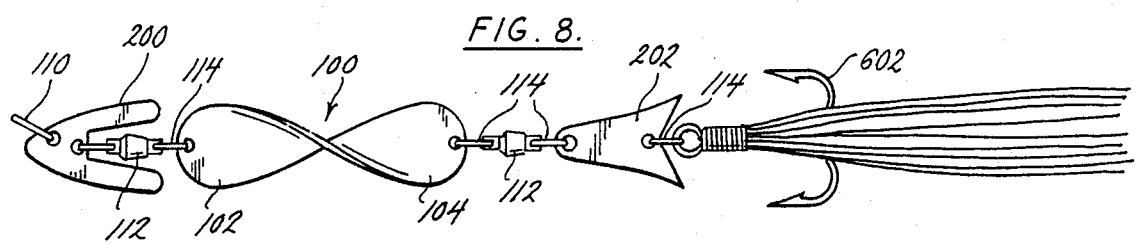
FIG. 8.
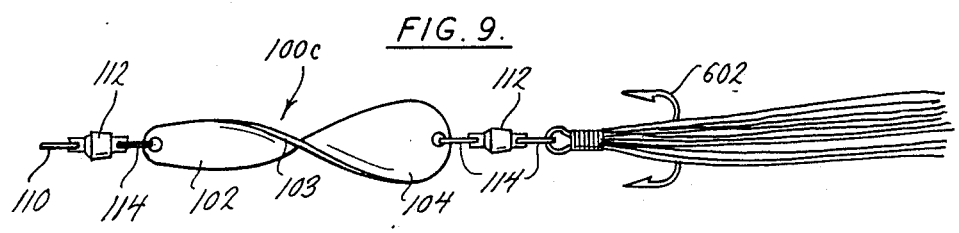
FIG. 9.
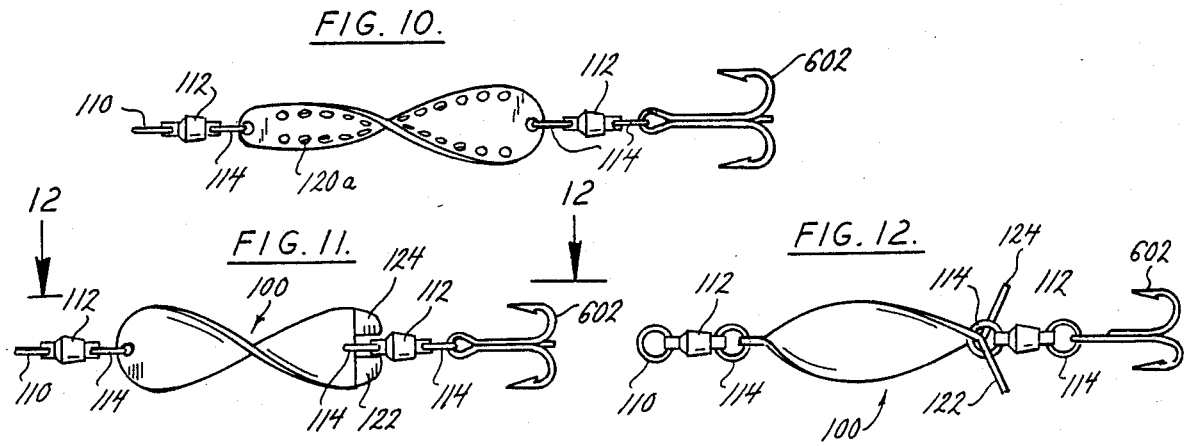
FIG. 10.
FIG. 11.
FIG. 12.
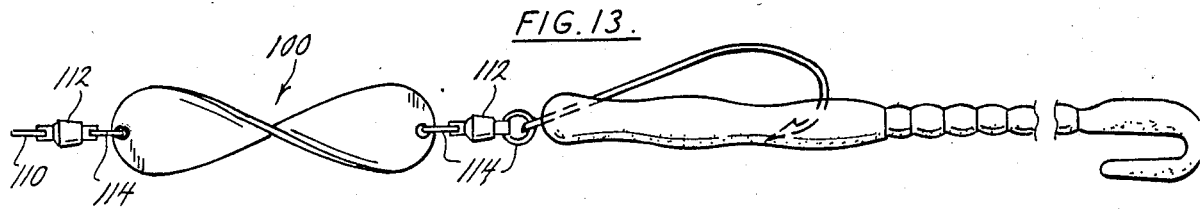
FIG. 13.

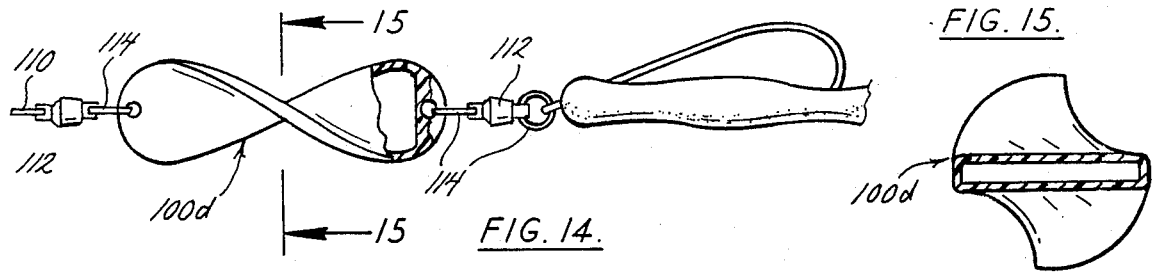
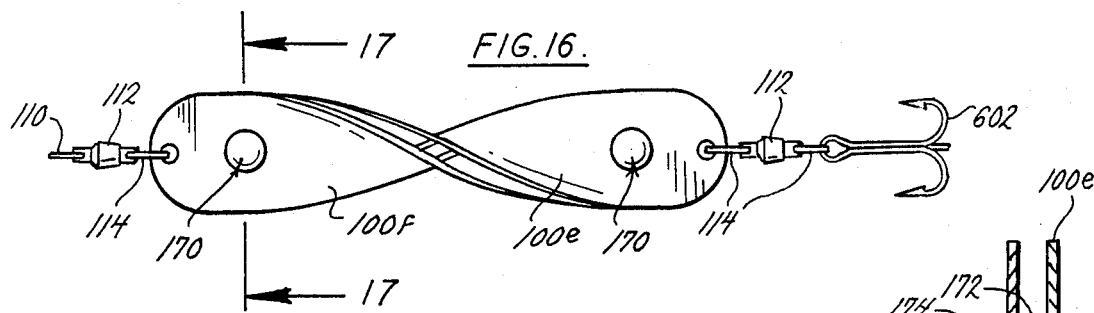
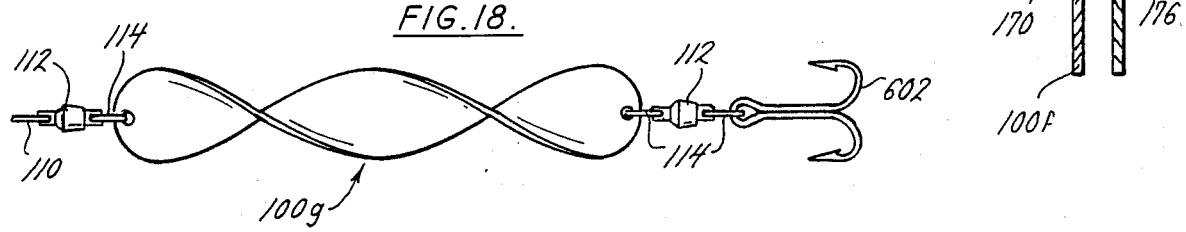
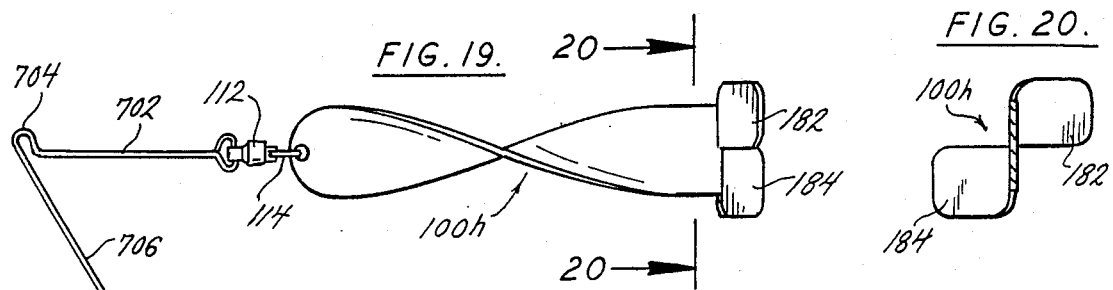
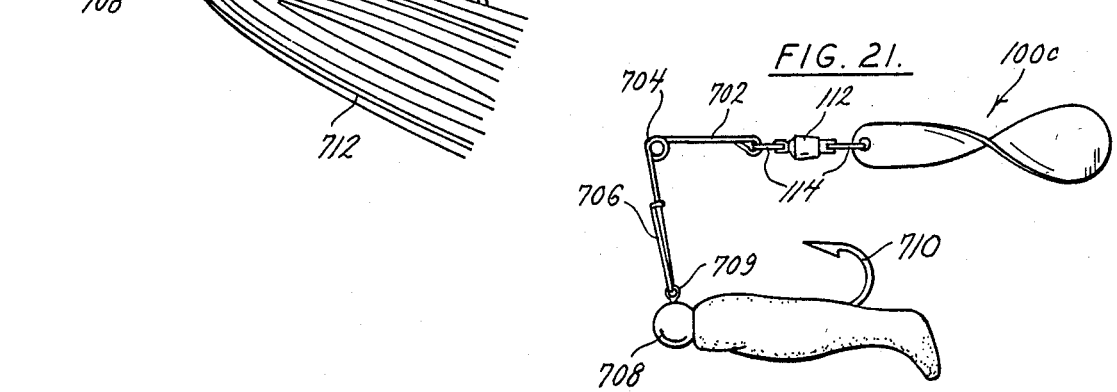

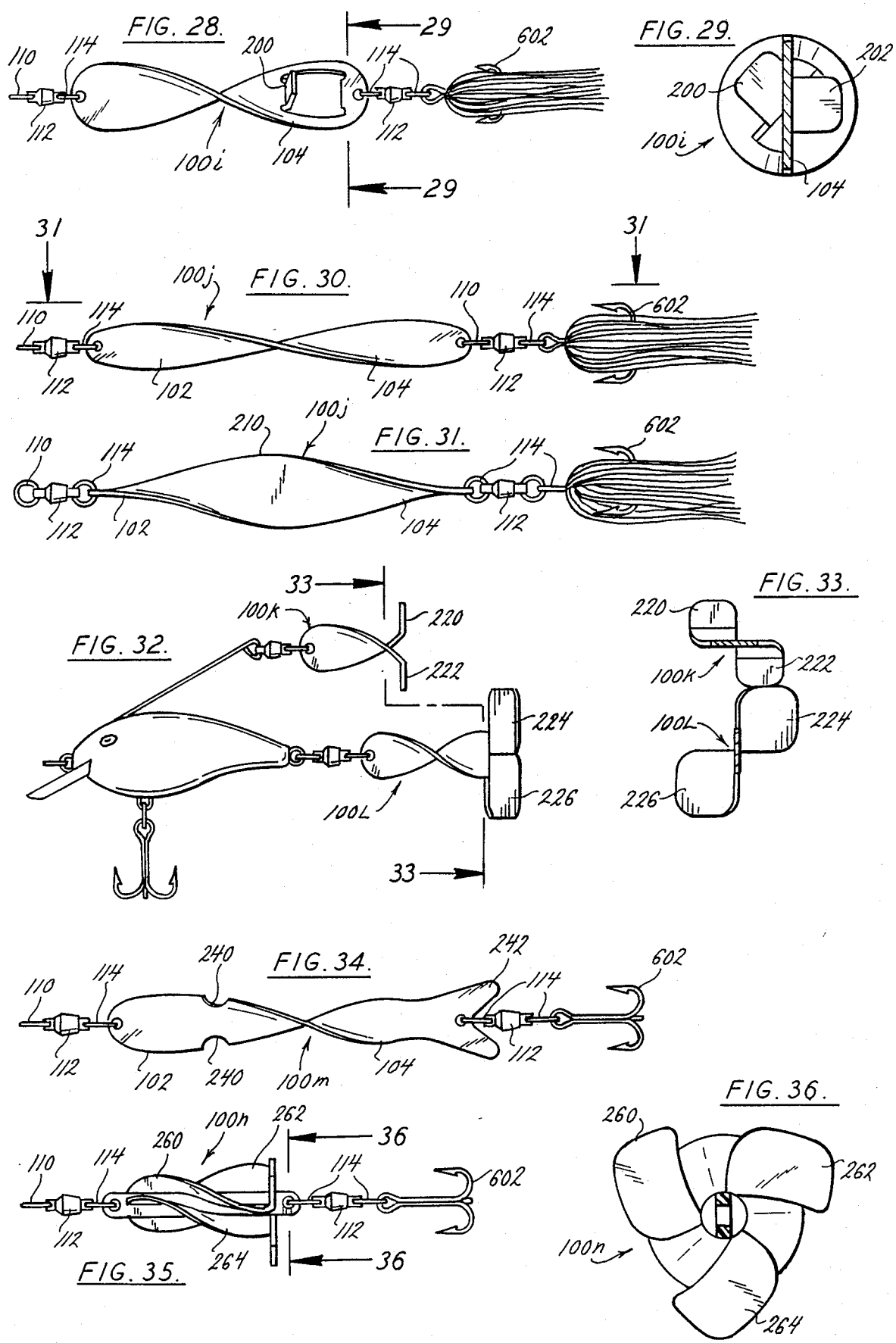

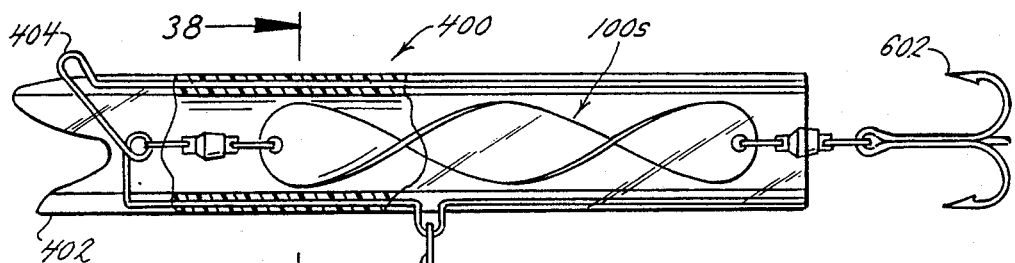
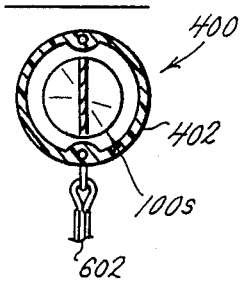
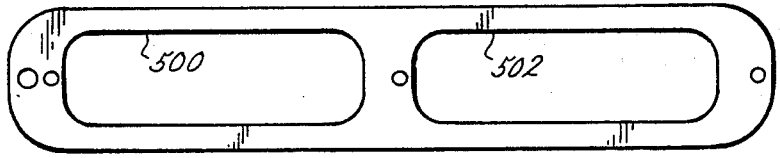
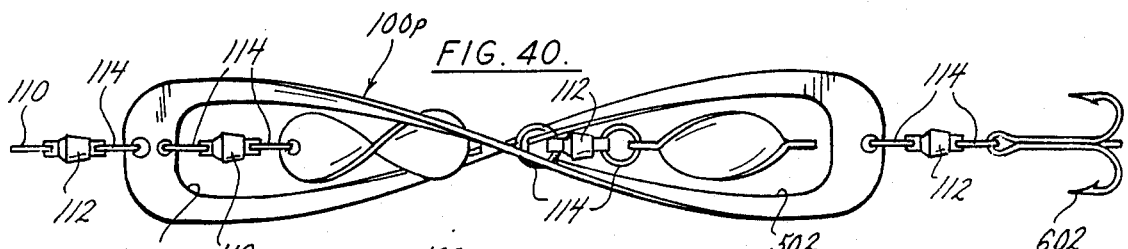
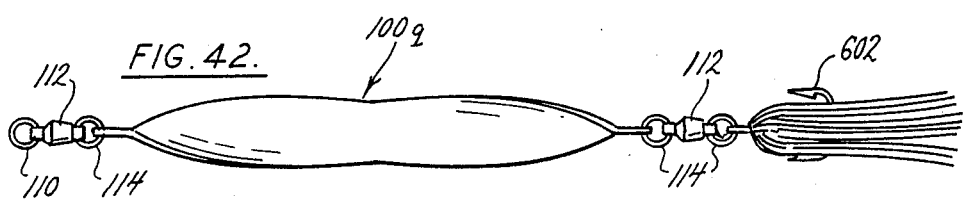
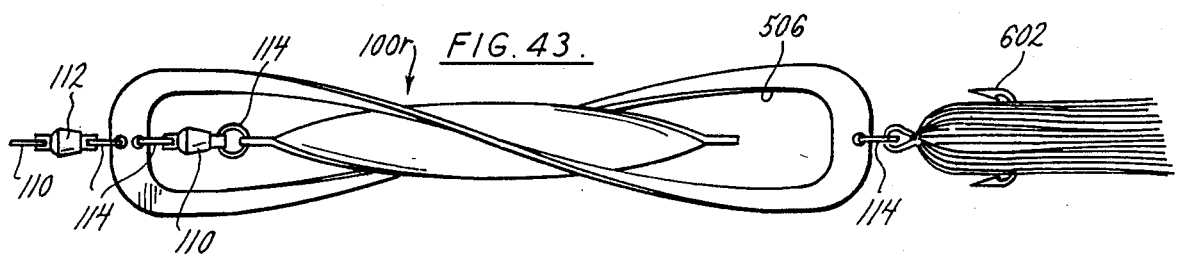

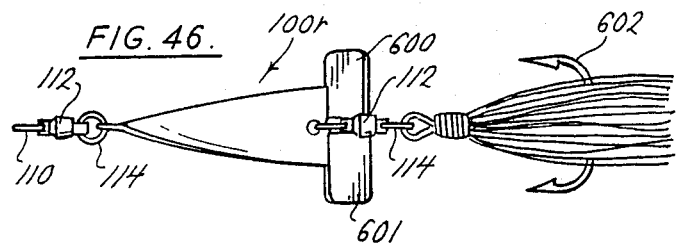
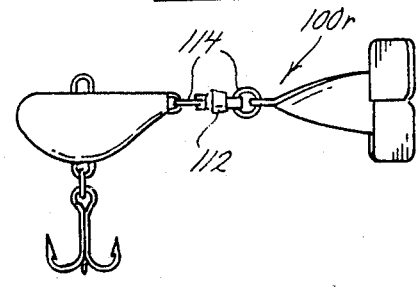
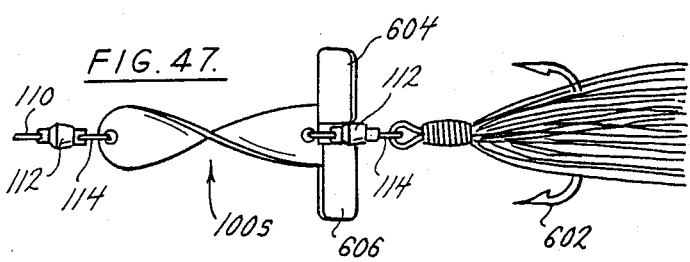
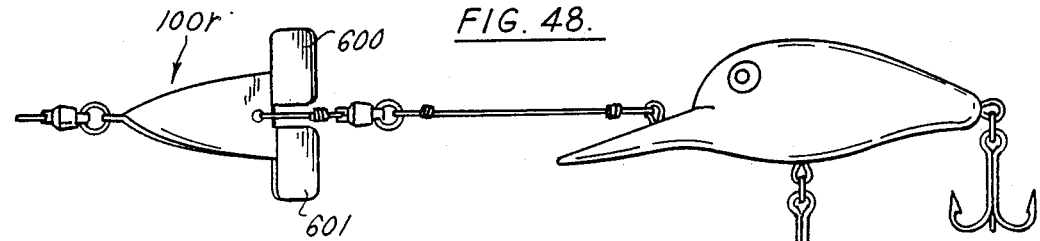
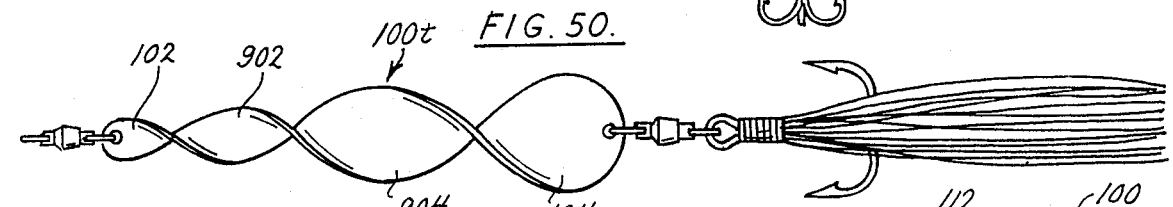
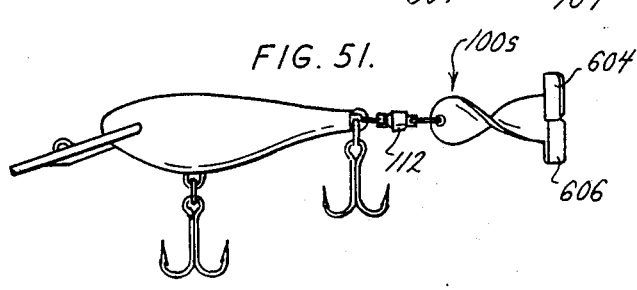
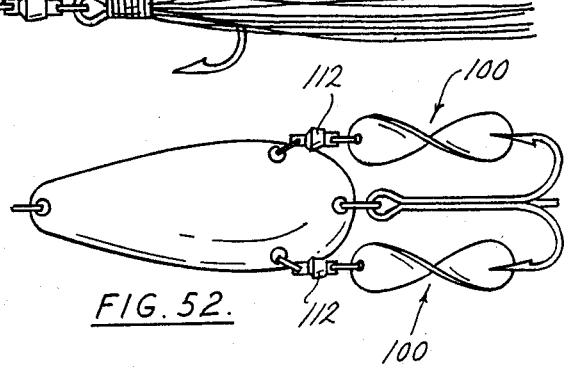
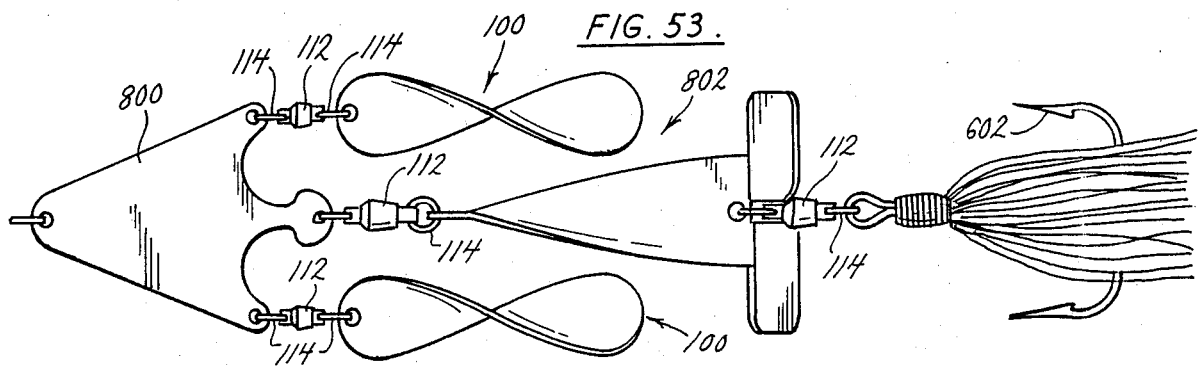

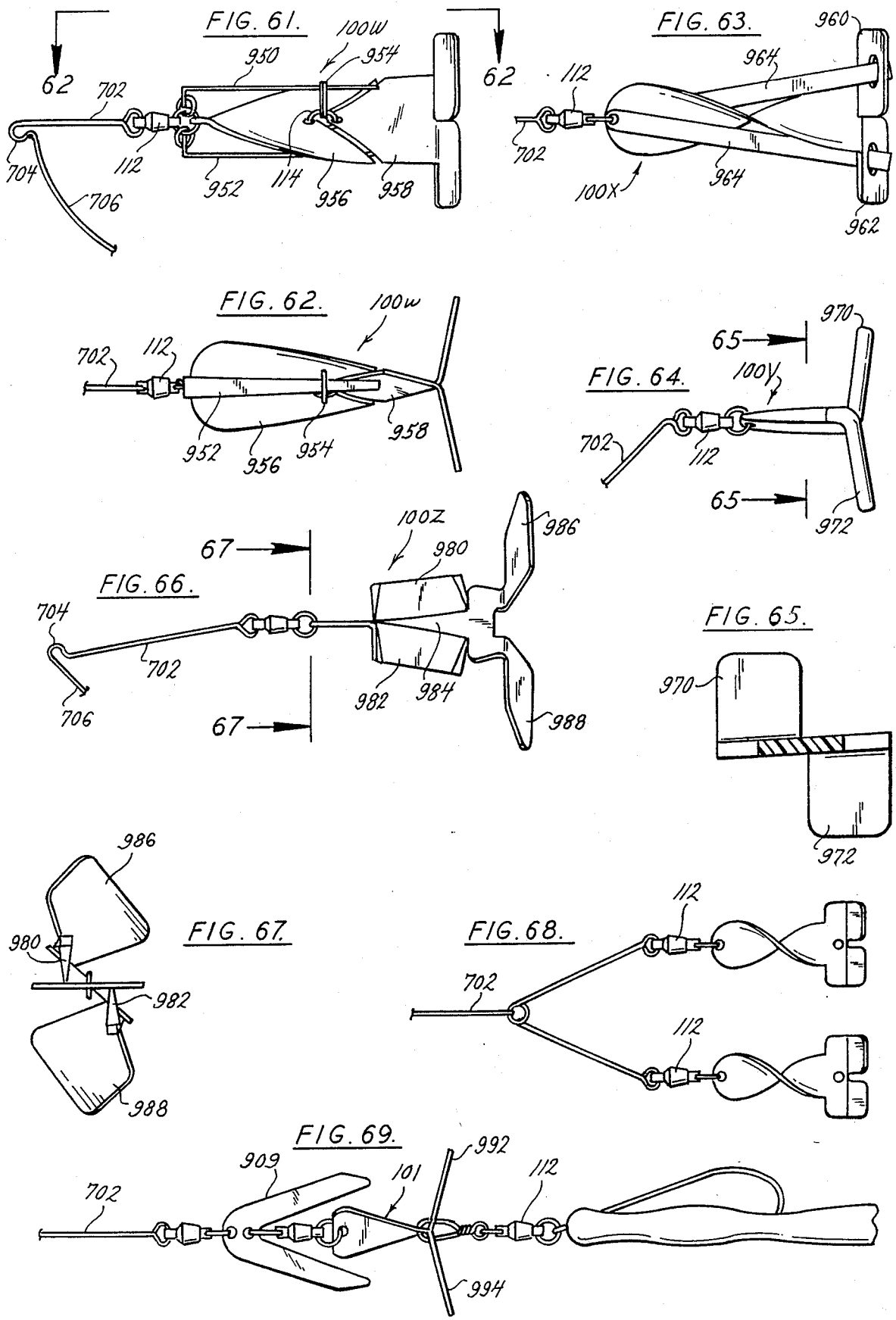

FISHING LURE

BACKGROUND OF THE INVENTION

This invention relates to a fishing lure, and more particularly, to an improved spinner element design which can be used in buzz bait, spinner bait or crank bait lure configurations.

Various fishing lures have been used to attract fish thereto so as to hook a fish striking the lure. Such lures can be generally categorized into spinner bait, buzz bait and crank bait lures.

Spinner bait lures are designed for use under the surface of the water. One type of spinner bait lure utilizes a spinning member rotatable about a fixed shaft or wire. Problems have arisen with such a configuration as the water pressure tends to lock the spinning member to the shaft. Therefore during lure retrieval there is no positive rotation of the spinning member about the shaft and thus no fish-attracting action. Weeds may also become entangled about the spinning member and the shaft so as to prevent the spinning member from rotating during lure retrieval which decreases the efficacy of the lure. Furthermore the spinning member of such lures does not rotate during submergence to the desired depth. Thus, no fish-attracting action is presented to the fish therebelow. In some instances weights have been added to the lure so as to allow it to sink more rapidly and rotate the spinning member. However such weights need be removed when fish travel near the surface of the water.

Spinner bait lures have used a cupped type of spinner blade which eccentrically rotate about an axis during lure retrieval. However, the absence of the fixed wire/shaft presents an "arc" or "dash-about" path to the spinner blade. This motion is contrary to a "straight-line" action which is believed to be similar to the fish's food, e.g. minnows, smaller fish and the like. Also such a straight line motion is difficult to achieve if the lure is slowly retrieved through the water. Such a slow retrieval is desirable during periods of relative fish inactivity, such as when the water temperature is below 55° F. If such a lure is retrieved too fast, the whole lure may rotate which again presents unnatural visual effects and decreases the efficacy of the lure. Thus, such blades have restricted retrieval speeds. Also the "arc" or "dash-about" paths restrict the use of the lure to weedless areas. Finally, such spinner bait lures are not effective at the water surface and cannot be effectively used in a "buzz bait" mode as to be subsequently described.

Another type of lure configuration is known as the "buzz bait" lure. This lure has a shaft-mounted, spinner element designed for fast retrieval along the surface of the water. Noise or "buzz" is generated by the spinner element so as to attract fish thereto. Such a lure is preferably used when the water is at least 55°, and after the spawning season when the fish are more active. However the buzz bait lures are designed for surface use only.

Crank bait lures utilize a plug which floats along the surface of the water at rest but dives to the deep water during lure retrieval. A lip or bill on the lure provides for such diving when the lure is retrieved after casting.

Although all of these lures are assumably effective in their operation, I have found that no one lure offers a consistent fish-attracting action during a wide range of retrieval speeds.

In response thereto I have designed a spinner blade combination, which eliminates the use of a longitudinal shaft/wire while still maintaining a generally straight-line motion for the rotating spinner blade during lure retrieval. As such, I have invented various types of lures utilizing novel blade designs which can be retrieved at various speeds while still presenting a fish-attracting action. My spinner blade designs effectively rotate either during submergence and below or above the surface of the water with a controlled, consistent, straight-line action during lure retrieval. Accordingly a family of fishing lures using my blade design, enables a fisherman to use the lures either in buzz bait, spinner bait or crank bait modes.

It is therefore a general object of this invention to provide a fishing lure having a novel spinner blade configuration.

Another general object of this invention i to provide a spinner blade, as aforesaid, which can be used in either spinner bait, buzz bait or crank bait lures.

Still another object of this invention is to provide a fishing lure with novel blade design, as aforesaid, which presents a consistent, fish-attracting action during a wide range of lure retrieval speeds.

Another object of this invention is to provide a fishing lure, as aforesaid, which presents a natural in-line fish-attracting action during lure retrieval.

Still another object of this invention is to provide a fishing lure, as aforesaid, which presents fish-attracting vibrations when used either above or below the water surface.

A further object of this invention is to provide a fishing lure, as aforesaid, which can be utilized in either weed or weedless areas.

A particular object of this invention is to provide a fishing lure, as aforesaid, having a spinner blade which presents a consistent rotating action.

Still another particular object of this invention is to provide a novel blade design, as aforesaid, which can be combined with other fishing lures so as to enhance the fish-attracting action of said lures.

Other objects and advantages of this invention will become apparent from the following description taken in connection with the accompanying drawings, wherein as set forth by way of illustrations and examples, embodiments of this invention.

BRIEF DESCRIPTION OF THE DRAWINGS

FIG. 1 illustrates a first embodiment of the fishing lure utilizing the basic blade design with a trailing treble hook placed thereon;

FIG. 2 is a top plan of view of the embodiment illustrated in FIG. 1;

FIG. 3 is a sectional view, taken along line 3—3 in FIG. 2 and illustrating the water collection surfaces of the blade;

FIG. 4 is a top plan view, similar to that set forth in FIG. 2, illustrating the use of a plurality of apertures in the blade design;

FIG. 5 is a plan view illustrating the use of a first upstream and second downstream spinner blades in a fishing lure;

FIG. 6 is a plan view illustrating the use of three in-line spinner blades;

FIG. 7 illustrates the use of a pair of spinner blades, as in FIG. 5, in one lure with the upstream blade having a smaller water collecting surface than the downstream blade;

FIG. 8 is a plan view illustrating the use of a single spinner blade with fishhead and fishtail elements;

FIG. 9 is a plan view illustrating the use of an alternative embodiment of a spinner blade design;

FIG. 10 is a plan view illustrating the use of apertures in the spinner blade design of FIG. 9;

FIG. 11 is a plan view of a fishing lure utilizing the novel blade design with a split-tail at the downstream end thereof;

FIG. 12 is a top view, taken along lines 12—12 in FIG. 11, illustrating the split-tail configuration;

FIG. 13 illustrates the use of the novel blade design in a weedless lure;

FIG. 14 illustrates a weedless lure using a hollow blade design;

FIG. 15 is a sectional view, taken along lines 15—15 in FIG. 14, illustrating the hollow configuration of the blade;

FIG. 16 is an alternative embodiment of the spinner blade design illustrating first and second nested blades connected in a spaced apart configuration therebetween;

FIG. 17 is a sectional view, taken along lines 17—17 in FIG. 16, illustrating the means of blade connection and the resulting spaced apart configuration between the blades;

FIG. 18 is another embodiment of the spinner blade illustrating a multi-twisted blade design;

FIG. 19 illustrates a spinner bait lure utilizing the novel split-tail blade design;

FIG. 20 is a sectional view, taken along line 20—20 in FIG. 19, illustrating the split-tail configuration;

FIG. 21 is a plan view illustrating the blade design of FIG. 9 in a spinner bait lure;

FIG. 28 illustrates the spinner blade design with adjustable fins normally extending from the downstream end thereof;

FIG. 29 is a sectional view, taken along lines 29—29 in FIG. 28, illustrating the adjustable fins;

FIG. 30 is a plan view, illustrating the use of an elongated tear drop configuration in the downstream and upstream ends of the blade design;

FIG. 31 is a top plan view, taken along line 31—31 in FIG. 30;

FIG. 32 illustrates the use of first and second split-tailed spinner blades in combination with a crank bait lure;

FIG. 33 is a sectional view, taken along lines 33—33 in FIG. 32;

FIG. 34 illustrates the use of a spinner blade, as shown in FIG. 31, with notches in the upstream end of and a tail at the downstream end thereof;

FIG. 35 illustrates another embodiment of a spinner blade design using a plurality of spaced apart spirals thereon;

FIG. 36 is a sectional view, taken along lines 36—36 in FIG. 35;

FIG. 37 illustrates another fishing lure with a spinner blade being mounted inside a fish-like tube;

FIG. 38 is a sectional view, taken along lines 38—38 in FIG. 37;

FIG. 39 is a plan view of a blank for a spinner blade prior to being twisted to its FIG. 40 configuration;

FIG. 40 is a plan view of a spinner blade design utilizing the blank in FIG. 39 with spinner blades being mounted within the apertures thereof;

FIG. 41 illustrates the use of an hour glass configured blank;

FIG. 42 illustrates the blank of FIG. 41 being twisted into an alternative spinner blade design;

FIG. 43 illustrates another spinner blade design having an oval aperture with a spinner blade mounted therein;

FIG. 44 illustrates another embodiment of a spinner blade utilizing fins emanating from the downstream end thereof;

FIG. 45 is a sectional view, taken along lines 45—45 in FIG. 44;

FIG. 46 illustrates an alternative spinner blade having a quarter spiral twist of the upstream end having a split-tail configuration presenting the downstream end thereof;

FIG. 47 illustrates the use of a full twisted spinner blade having a split-tail configuration thereon;

FIG. 48 illustrates the use of the blade of FIG. 46 in connection with a crank bait lure;

FIG. 49 illustrates the use of the blade of FIG. 46 in connection with the rear end of a crank bait lure;

FIG. 50 illustrates the use of progressively increasing spirals in a multi-twisted spinner blade;

FIG. 51 illustrates the use of the blade of FIG. 47 in connection with another crank bait lure;

FIG. 52 illustrates the use of the first and second spinner blades in connection with a spoon lure;

FIG. 53 is a top plan view, illustrating a lure with first and second spinner blades and blade of FIG. 46 in connection with a fishhead configuration and a spinner blade of FIG. 46 to present the tail thereof;

FIG. 61 illustrates a jointed spinner blade having vibrating rods extending through the last section of the spinner blade;

FIG. 62 is a view taken along line 62—62 in FIG. 61;

FIG. 63 illustrates another spinner blade design having vibratory vanes thereon;

FIG. 64 is a side view of a split-tailed spinner blade having a slight twist through the body member thereof;

FIG. 65 is a sectional view, taken along line 65—65 in FIG. 64;

FIG. 66 is a side view of a split-tailed spinner blade having a split-tailed body member thereof;

FIG. 67 is a view taken along line 67—67 in FIG. 66;

FIG. 68 illustrates the use of side by side split-tailed spinner blades;

FIG. 69 illustrates a lure having a fish configuration as presented by a chevron head and a spinner blade mounted thereto;

DESCRIPTION OF THE PREFERRED EMBODIMENT

Figure 22:
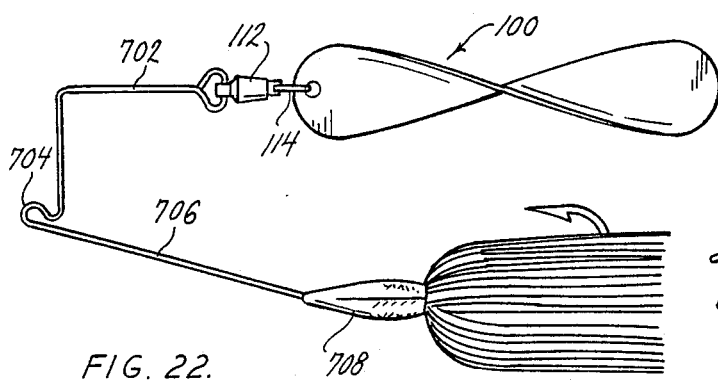
FIG. 22 illustrates the use of the blade design on a buzz bait wire.

Turning more particularly to the drawings, FIG. 1 illustrates a first embodiment illustrating my novel blade design 100. The upstream end of blade 100 is connected to a fishing line 600 by a stainless steel ring 110/swivel 112/split ring 114 combination. A trailing treble hook 602 with fish-attracting rubber 604 thereon is attached to the opposed, downstream end of the blade 100.

The blade 100 comprises an upstream end 102 and a downstream end 104 which have been twisted about an imaginary, central, longitudinal axis 101 passing through the upstream 102 and downstream 104 ends. The resulting full convolution or twist, designated generally as 106, is symmetrical about the imaginary longitudinal axis 101. This symmetry cooperates with the downstream and upstream swivel 112/ring 114 combinations to consistently rotate the blade 100 about the imaginary longitudinal axis 101 in a straight-line action during lure retrieval. This action results from the water passing over and under the upstream end 102, collecting in equal amounts at the midpoint 103 of the spiral and then being discharged along the opposed surfaces of the downstream end 104. The combination of the blade 100 with the swivel 112/ring 114 combinations dispenses with the need to use a physical shaft about which to mount the spinner member and thus eliminates the friction/binding problems associated with such shafts. This shaft elimination enhances the ability of my blade 100 to be used in either a buzz bait or spinner bait lure, as my blade moves in a straight-line action as opposed to the cast about action of previous fish-attracting lures which are not mounted on physical shafts.

FIGS. 2 and 3 illustrate that the maximum portion of the spiral appears at the midportion of the blade 100. Thus the water passing about the opposed sides of the upstream end 102 is generally equal to the water passing on the opposed sides of the downstream end 104. This relationship maintains the desired straight-line action of the rotating blade 100 during lure retrieval.

It is here noted that the swivel 112/blade 100 combination will allow the blade to rotate during sinking. Thus the lure, when desired to be used as a spinner bait below the surface of the water, will offer an initial visual attraction to the fish while it is sinking to the preselected depth desired by the fisherman.

FIG. 4 illustrates another blade design, 100a, similar to the design 100 shown in FIGS. 1–3. A plurality of apertures 120 are positioned along the edges of the convolution at the central portion of the blade 100a. During lure retrieval, the rotation of the blade 100a causes water to flow through these apertures 120. This action provides for an audio gurgling action and a visual formation of air bubbles accompanying the rotation of the blade. Such actions attract fish thereto. As such the lure 100a can be used either in a buzz bait mode, i.e. retrieved along the surface of the water or a spinner bait mode, i.e. retrieved below the surface of the water.

FIG. 5 illustrates the use of a sequential tandem of blades 100b' and 100b. Each blade has an upstream 102 and downstream 104 end with a twist or convolution utilized therebetween. The upstream blade 100b' is smaller than the downstream blade 100b. This relationship assures that both blades will rotate in a smooth action about their imaginary longitudinal axis during lure retrieval. If the upstream blade is larger than the down-stream blade the downstream blade may erratically rotate during lure retrieval as the larger upstream blade may impede passage of water over the upstream end of the downstream blade. The convolutions of the blades are in opposed directions so that the rotation of the upstream blade 100b' is opposite the rotation of the downstream blade 100b as diagrammatically shown in FIG. 5. This relationship enhances the lure's visual attraction to fish.

FIG. 6 illustrates the use of a plurality of blades 100 as shown in FIG. 1. Although the three blades shown in FIG. 6 are of equal size it is understood that various sizes may be used in the tandem. However it is preferred that upstream blades are always equal to or smaller than the adjacent downstream blade. This relationship assures that all blades 100″, 100′, 100 will rotate during lure retrieval in a consistent straight-line action and thus enhance its visual stimuli to the fish. This size relationship, as in FIG. 5, is also shown from a different perspective in FIG. 7 in which the upstream blade 100′ is smaller than the downstream blade 100. Thus the blades will rotate in a consistent straight-line action during lure retrieval. (The blades may rotate in the same or opposed directions).

FIG. 8 illustrates another lure embodiment utilizing the blade 100 design. This embodiment presents a fishhead 200 and a fishtail 202 with the blade 100 interposed therebetween. The head 200 is connected to the upstream end 102 of the blade 100 by the swivel 112/ring 114 combination. The tail 202 is connected to the downstream end 104 by a swivel 112/ring 114 combination. A treble hook 602 is attached to the tail 202 by a ring 114. I have shown the upstream swivel 112 being within the confines of the fishhead 200 so as to hide the same. It is understood that the rear downstream swivel 112 can be similarly hidden within a modified tail configuration. The use of the fish 200/tail 202 combination with my novel blade design presents a straight-line action to the lure within a fish-like configuration so as to attract the game fish thereto.

FIG. 9 illustrates an alternative blade design, 100c, in which the upstream end 102 is of a teardrop shape configuration so that the convolution 103 of the blade 100 extends in a greater longitudinal extent along the length of the blade 100c. This configuration decreases the rate of rotation of the blade about its longitudinal axis during lure retrieval. This blade may be utilized in the early spring or in cold water fishing as slow moving bait is more attractive to the fish which are less active at this time.

FIG. 10 illustrates the blade, as shown in FIG. 9, with the addition of a plurality of apertures 120 along the length of the blade. As earlier described in connection with the blade of FIG. 4, these apertures allow for the passage of air, sunlight and/or water therethrough. Upon blade rotation visual and audio stimuli are presented to the game fish. The apertures 120a have been positioned along the perimeter of the blade so as to compensate for the relatively slow rotation thereof of the basic blade design, 100c.

- FIG. 11 illustrates a modification to the basic blade design 100. This modification comprises the addition of split-tails 122, 124 to the downstream end 104 of the blade. This split-tail configuration, in which the tail elements 122, 124 extend in opposed directions, (FIG. 12) enhances the speed of blade rotation. Also the opposed rotation of the tail sections 122, 124 grab water and air which are then directed about the blade 100. As such the modified blade 100 can be used in either a spinner bait or buzz bait modes, as is to be subsequently described.

FIG. 13 illustrates the use of the basic spinner blade 100 in connection with a weedless lure as presented by a rubber worm and hook attached in line thereto. The in-line position increases the probability of hooking a fish as the fish attacks the rotating blade. This provision allows the lure to be used in weedy areas as there is no physical shift about which the weeds may be wound.

As illustrated in FIGS. 14 and 15 the spinner blade 100d has a hollow configuration. As such the blade may be used in a buzz bait lure which will float instead of sinking upon cessation of lure retrieval.

FIG. 16 illustrates the use of my basic blade design 100 in a tandem, nested relationship. As such first 100e and second 100f blades are held in a nested relationship by insertion of spacer type rivets 170 extending therethrough as best shown in FIG. 17. These rivets 170 includes an intermediate collar 172 with opposed heads 174, 176 spaced therefrom. As shown in FIG. 17 the collars 172 space apart the nested upstream ends and downstream ends of the respective blades. Upon movement of the lure through the water the blades 100e, 100f will rotate about their common, imaginary longitudinal axis. Passage of the water through the area between the spaced apart blades presents a visual white water effect and an audio gurgling effect so as to attract fish thereto. It is understood that the distance between the respective heads 174, 176 and the collar 172 may be greater than the thickness of the blades. The back and forth play of the blades along the rivets 170 present fish-attracting vibrations during blade rotation.

FIG. 18 illustrates another embodiment of the blade design 100g in which a plurality of twists are incorporated in the same basic blade. The modification maintains its straight line action upon rotation in a manner similar to that shown with my earlier twisted blades while increasing the visual fish-attracting action.

FIG. 19 illustrates the use of a split-tail, blade 100h design in a spinner bait lure. As such a horizontal spinner bait wire 702 terminates in a line anchor 704 to which the fishing line 600 is attached. Downwardly extending from the line anchor is a wire 706 with a lead body 708 thereon. A hook 710 camouflaged by live rubber 712 extends from this weight 708. The spinner bait lure is designed for use below the water surface. The blade presents a visual rotation and straight-line action as opposed to the arc type or cast about actions associated with previous spinner bait designs. As the straight-line action is a more natural action of a swimming fish, game fish are attracted thereto. The split-tail design, as presented by vanes 182, 184 enhances the rotation of the blade. Also these tails collect water and air which presents a noise stimuli to the game fish during lure retrieval.

FIG. 21 illustrates an alternative spinner bait lure design. A wire snap 710 is clamped to the depending wire section 706. The snap 710 allows for attachment of the eye 709 of the lead head 708 and hook 710 attached thereto. A spinner blade 100c is attached to the wire 704 and rotates in a straight-line action during retrieval of the fishing lure attached to line 600.

Figure 23:
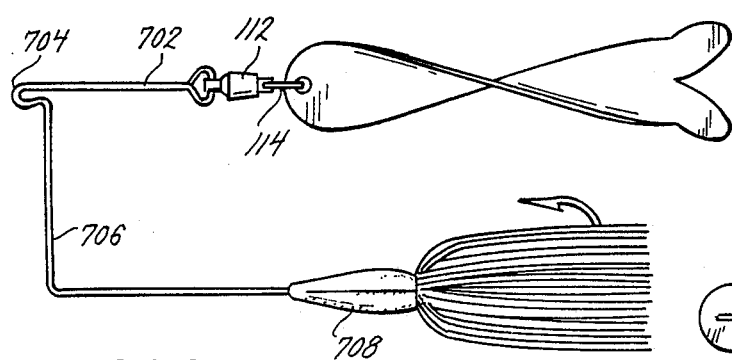
FIG. 23 illustrates the use of a modified spinner blade in a wire configuration which can be used as a spinner bait or buzz bait lure.
Figure 26:
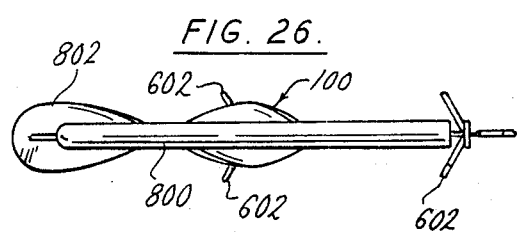
FIG. 26 is a top view, taken along lines 26—26 in FIG. 25.

FIG. 22 illustrates the utilization of a blade 100 in a buzz bait type of configuration. The line anchor 704 is positioned below the surface of the water while FIG. 23 illustrates the use of the line anchor at the surface of the water for a spinner or buzz bait configuration. FIG. 22 is the standard buzz bait wire configuration with the line anchor below the water. I have found that the use of my novel blade designs enables me to present a lure configuration as shown in FIG. 23 in which the line anchor 704 is near the surface of the water. As such the FIG. 23 configuration may be used in either a buzz bait, i.e. retrieved along the surface of the water, or as a spinner bait, i.e. retrieved below the surface of the water, lure. The twisted blade more efficiently grabs the water and cooperates with the swivel 112 to allow for a wide range of retrieval speeds while still allowing the blade to rotate. The blade grabs the water and produces audio popping and slapping stimuli during blade rotation. The amount of blade twist determines the level of popping and slapping with louder stimuli being produced by blades of a looser twist as the greater the twist the faster the rotation and the less the noise stimuli. The utilization of my novel blade designs with the swivel 112 combination eliminates the need to have a fixed wire running through the blade so as to keep a straight-line action of the spinning member. As such the prior friction problems associated with wires shafts is eliminated. This elimination enables the lure to be used either at the surface or below the surface of the water. Thus the fisherman is able to "buzz" the top of the water and use the same lure below the surface of the water with consistent, straight-line action. As earlier described the use of the split-tail enhances the rotation of the lure and also creates audio stimuli when being retrieved at or below the surface of the water.

Figure 24:
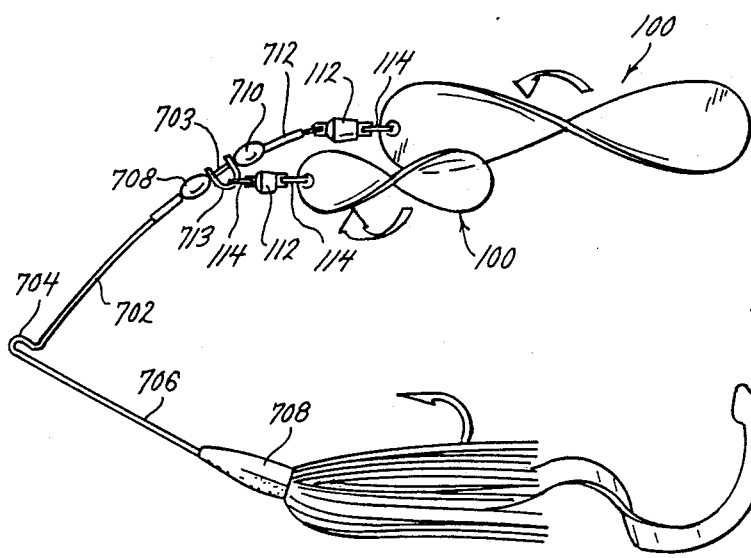
FIG. 24 illustrates the use of a lure having first and second spinner blades in a combination so as to create fish-attracting vibrations during lure retrieval.

FIG. 24 illustrates the use of first and second spinner blades in a spinner bait type of wire. The smaller blade 100 is attached to the line 703 between first and second spacer beads 708, 710 by means of a clevis 713 mounted on the wire 703. A spacer tube 712 is positioned between the bead 710 and a swivel 112 attached thereto. The swivel 112/split ring 114 combination attaches blade 100 to the anchor. As diagrammatically indicated, the blades are spirally configured so as to rotate in opposed directions. Attached to clevis 713 via a split ring/swivel combination is a smaller blade 100 designed to rotate in a direction opposite that of the larger blade. During line retrieval, as attached to anchor 704, the blades rotate about their longitudinal axis in opposed direction so as to create a fish-attracting vibratory stimuli along with the visual stimuli offered by the two rotating blades.

Figure 25:
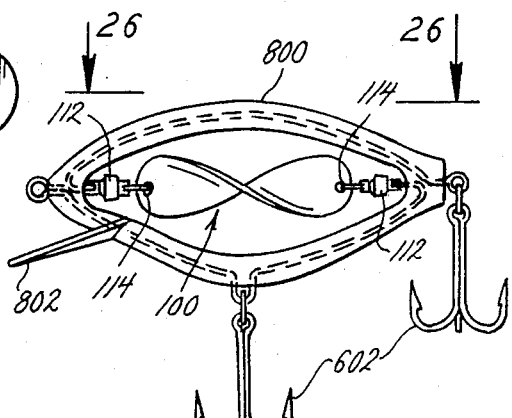
FIG. 25 illustrates the use of the spinner blade in a crank bait lure.

FIG. 25 illustrates the use of a blade 100 in a crank bait configuration. The crank bait is presented by a fishlike frame 800 having a hollow core therein. A blade 100 is attached to the sides of the crank bait by two ring/swivel/split ring combination as illustrated in FIG. 25. A diver bill 802 urges the crank bait downward during lure retrieval. Treble hooks depend from various locations on the crank bait frame 800. During lure retrieval the rotation of the blade 100 cooperates with the diving movement of the crank bait so as to provide a visual stimuli to the game fish. If preferred, one end of the blade 100 may be free from the frame 800. As such the blade will hit the frame creating a vibratory stimuli.

Figure 27:
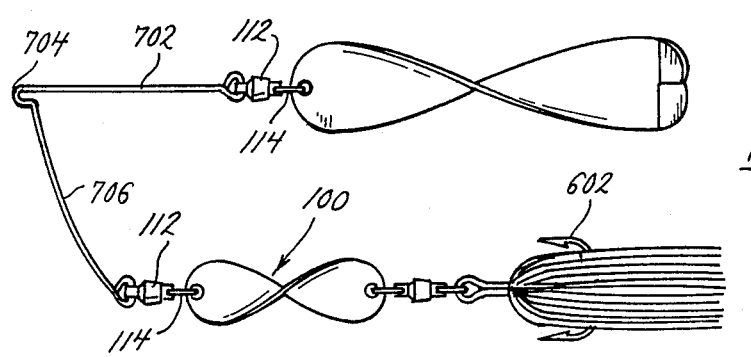
FIG. 27 illustrates the use of the first and second vertically spaced-apart blades in a spinner bait type lure.

FIG. 27 illustrates another embodiment of a fishing lure with the line anchor 704 near the surface of the water. An upper split-tailed spinner blade is attached to the upper horizontal run of wire 702 with blade 100 being attached to the depending portion 706 thereof. As such both spinner blades will rotate during lure retrieval with the upper blade providing a buzz bait type of action at the water surface with the lower blade providing a spinner blade type of action below the water surface. As such the combination of these actions presents a stimuli to the game fish at both the surface and below the surface of the water.

FIG. 28 illustrates another embodiment 100i of the invention as presented by first 200 and second 202 vanes extending from the downstream end 104 of the blade 100i. The vanes 200, 202 are adjustable from a position in which they lie essentially flush with the body of the blade to a position which they approach a generally normal relationship to the body of the blade as illustrated in FIG. 28 and thus shown in FIG. 29. The position of the vanes 200, 202 effects the speed of rotation of the blade during the lure retrieval. This rotation allows the lure to be used in various water temperature conditions. (A slower rotation is desired in cold water and pre-spawning periods). The adjustability of the vanes 200, 202 also regulates the white water action produced by the vanes during blade rotation. As such, rotation of the blade provides visual and audio stimuli to the game fish.

FIGS. 30 and 31 illustrate the use of the basic teardrop type of blade as earlier described in which the teardrop configuration (FIG. 9) is at both ends of the blade 100j. As such it is understood that modification of the ends of the blade 102, 104 are possible so as to effect the speed of blade rotation. This elongated configuration of the ends 102, 104 causes the middle 210 of the blade 100j to collect and release more water than on each end of the blade. The low water reception at the front of the blade and the low release of water at the rear of the blade causes a zig zag path during lure retrieval. This zig zag path is referred to in the bass fish industry as "walking the dog". The embodiment of this blade as so configured eliminates the practice and time involved to learn such a technique.

FIG. 32 illustrates the use of upper 100k and lower 100L blades with split-tail configurations in a crank bait lure. The use of an upper blade 100k having a half twist at its upstream end along with a lower blade having a full twist provides for different speed of blade rotation created during water retrieval. As previously described the vanes 220, 222, 224, 226 also effect blade rotation.

FIG. 34 illustrates another blade embodiment 100m having notches 240 located at the upstream end 102. The rear portion of the blade may also be cut away and provided with a tail 242 as illustrated. Various cutouts and notches 240 may be utilized in the basic blade design so as to create different water displacements of the blade which provides different stimuli to the game fish during lure retrieval.

FIG. 35 illustrates another embodiment 100n of the blade configuration in which multiple spirals 260, 262, 264 surround the basic shaft. Such spirals increase the speed of rotation of the blade 100n and effect the action of water passing therethrough so is to present different stimuli to the game fish therebelow.

FIG. 37 illustrates an alternative lure design 400 which mounts the blade 100s within a fish-like plastic tube 402. A wire with line anchor 404 is mounted within the tube 402. The blade 100g is mounted to wire by the standard ring 110/swivel 112 114 combination. Hook 602 is attached to the downstream end of the blade 100g. As water runs through the tube 404 during lure retrieval the blade 100s rotates so as to provide a visual fish-attracting stimulus. It is understand that the blade 100s may extend beyond the end of the tube.

FIG. 39 illustrates a basic blank of the blade 100p prior to twisting into the configuration 100p shown in FIG. 40. First and second oval apertures 500, 502 are provided in the blank. As shown in FIG. 40 each aperture 500, 502 may be provided with a blade therein with the blade being mounted in position by the ring 110/swivel 112/split ring 114 combination. During lure retrieval the blades will rotate presenting visual stimuli to the fish. The blades may hit the edges of the apertures so as to provide a vibratory fish-attracting stimuli. Furthermore, the passage of water through the apertures will create water action during rotation of the blades. The use of the oval apertures 500, 502 is for purposes of illustration but not limitation as it is understood that variously configured apertures may be used within the blade blank so as to present different visual stimuli to the fish during blade rotation.

FIG. 41 illustrates another basic blade blank 100q illustrating the teardrop effect at the ends of the blade blank prior to a partial twisting of the blade ends about the imaginary axis is shown in FIG. 42. During lure retrieval, the blade 100q creates a fish-attracting popping noise along with a visual jerking motion during blade rotation.

FIG. 43 illustrates another lure embodiment 100r having a single oval aperture 506 therein. As such an elongated spinner blade may be mounted within the oval aperture 506. During lure retrieval the blade will rotate and hit against the edge of the aperture 506 to create visual and audio fish-attracting stimuli.

FIG. 44 illustrates the use of adjustable vanes 204, 206 as earlier described in FIG. 28. The vanes 204, 206 are mounted in opposed directions relative to that in FIG. 28 so as to increase the water action. FIGS. 46 and 47 illustrate the use of the basic blade designs 100r and 100s having a bigger split-tail configuration. The split-tails 600, 602 of blade 100r present the downstream end of the blade. The split-tails 604, 606 of blade 100s is at the end of the downstream end of blade 100s. In both instances it is understood that the tail size increases the rotation of the blades 100r (quarter spiral), 100s (180 degree twist) during lure retrieval, and thus the visual and audio/popping stimuli. The twisted blade/swivel combination allows for a wide range of lure retrieval speeds so as to increase the versatility of the lure. FIGS. 48, 49, 51 illustrate the use of the blades as shown in FIGS. 46, 47 connected to a crank bait lure. The spinning blades present visual stimuli to the fish during longitudinal movement through the water. Furthermore, the blades will rotate during diving movement of the crank bait lure so as to present both visual and audio fish-attracting stimuli. FIG. 50 illustrates a blade 100t having a successive, increasing spirals throughout its length so as to present intermediate body portions 902, 904 thereof. Again the upstream portions are preferably smaller than the upstream portions so as to assure proper blade rotation. FIG. 52 illustrates the use of first and second blades in a spoon bait configuration which will produce visual and vibratory stimuli during lure retrieval as the blades knock against the treble hook during lure retrieval.

FIG. 53 illustrates an ocean type of lure which utilizes a fishhead 800 configuration along with first and second spinner blades extending therefrom. The fishtail 802 is presented by a blade as shown in FIGS. 42 or 47 and will rotate about the swivel 112 as shown. During lure retrieval multiple rotations of the head 800, tail 802 and blades present visual and vibratory stimuli.

Figure 54:
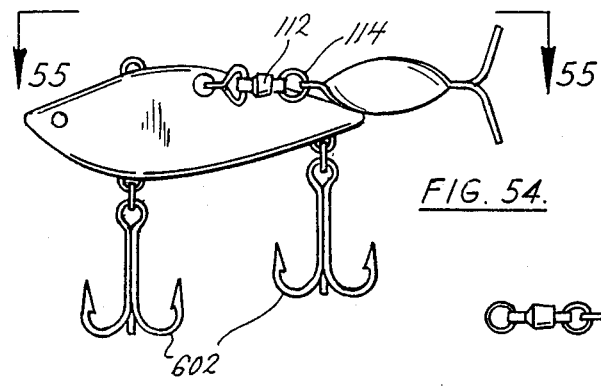
FIG. 54 illustrates the use of a spinner blade on one side of a crank bait lure.

FIG. 54 illustrates the use of a spinner blade with split-tail ends and mounted to the plug of a crank base lure. As illustrated the blade is connected to the side of the lure by the basic swivel 112/ring 114 combination which is connected to a wire normally extending therefrom.

Figure 55:
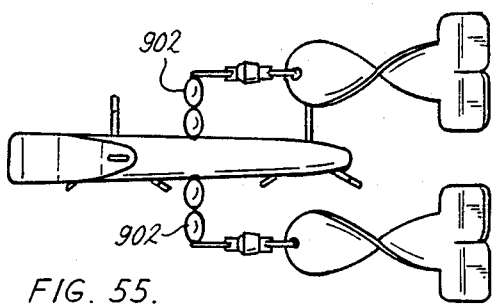
FIG. 55 is a top plan view of the lure set forth in FIG. 54.

FIG. 55 is a top view taken along line 55 in FIG. 54 and illustrate that the spinner blades may be used in a side by side relationship in connection with the crank bait lure. Therein spacer beads 902 may be utilized so as to space the blades away from the body of the crank bait plug. During lure retrieval the blade rotation will provide visual stimuli to the fish. Also, depending on the displacement of the blades away from the body of the lure, audio stimuli may also be presented due to the blades knocking against the crank bait plug or against each other.

Figure 56:
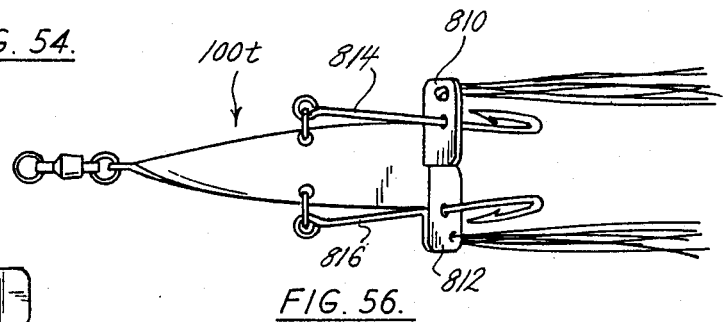
FIG. 56 illustrates the use of twisted hooks connected to the body of a split-tailed spinner blade as in FIG. 46 and extending through the tail sections thereof.

FIG. 56 illustrates the use of a blade 100*t* having a slight spiral thereto. Extending from the rear of the blade are split-tails 810, 812 with apertures therein. Hooks 814, 816 are attached to the body of the blade 100*t* and extend through such apertures. During lure retrieval the spinning of the blade will create fish-attracting stimuli causing the fish to strike the blade and hook itself on the adjacent hooks.

Figure 58:
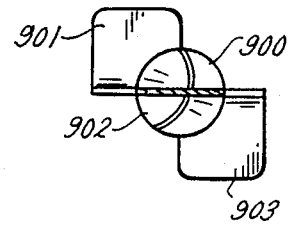
FIG. 58 is a sectional view, take along line 58—58 in FIG. 57.
Figure 60:
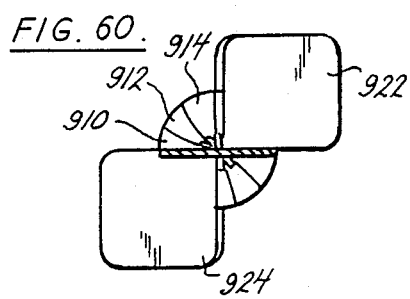
FIG. 60 is a sectional view, taken along line 60—60 in FIG. 59.
Figure 57:
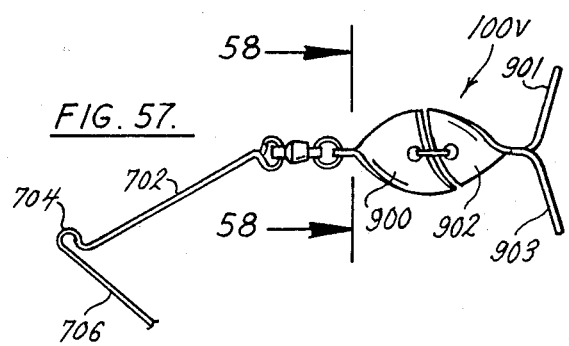
FIG. 57 illustrates a jointed spinner blade in connection with a spinner bait lure.
Figure 59:
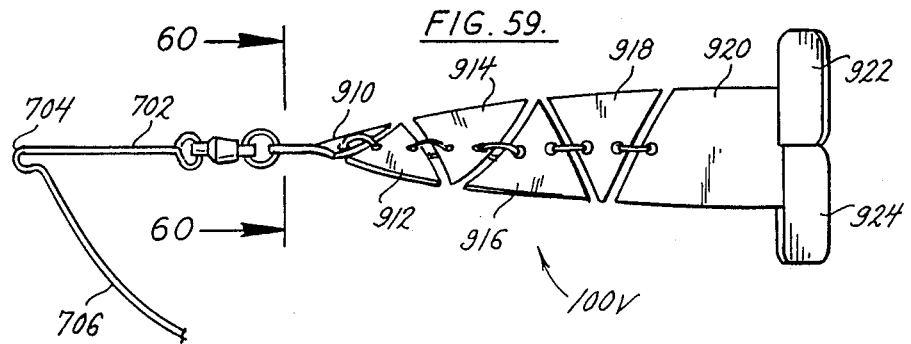
FIG. 59 illustrates a multi-jointed spinner blade.

FIG. 57 illustrates a twisted blade 100*v* with a split-tail configuration. However the body of the blade is divided into first 900 and second 902 segments. As shown in FIG. 58 the aligned segments still provide a spiral twist to the overall blade so as to enhance blade rotation. During lure retrieval the blade segments 900, 902 will individually move to provide further visual stimuli to the fish. Also the segments may rub one against the other so as to provide an audio stimuli to the fish. As illustrated in FIG. 59 the blade 100*v* may be elongated and have a plurality of segments 910, 912, 914, 916, 918, 920 which are aligned one with the other so as to present a spiral twist along the body of the blade as shown in FIG. 60. Again during lure retrieval the multiple segments will rotate and individually move so as to enhance the fish-attracting visual and/or stimuli of the blade. Although the segments are shown as being connected by wire rings 110 it is understood that they may be connected by the basic ring 114/swivel 112 combinations which would allow each segment to individually rotate during lure retrieval.

FIG. 61 again illustrates the use of a segmented blade 100*w* with split-tail thereon. First and second vibrating rods 950, 952 are attached to the front-end of the blade and extend through rings 954 normally extending from the split ring 114 attaching the first 956 and second 958 segments of the blade. During lure retrieval the blade will rotate causing the rods 950, 952 to vibrate against the rings 954 presenting an audio stimuli to the fish.

FIG. 63 illustrates the use of a blade 100*x* with a half twist and split tails 960, 962 with vibratory rods 964 being attached near the upstream end of the blade and extending through apertures in the split tails 960, 962.

Again during lure retrieval, the blade rotation will cause the rods 964 to vibrate within the apertures so as to present audio stimuli to the fish.

FIG. 64 illustrates a blade 100*y* having a short body member with a slight twist thereto. As best shown in FIG. 65 enlarged vanes 970, 972 are utilized so as to enhance the blade rotation which has been limited by the decrease in the twist of the body of the blade.

FIG. 66 illustrates another blade embodiment 100*z* in which the upstream end or body member is presented by first and second vanes 980, 982 extending from a central portion 984 of the body. Split-tail members 986, 988 extend from the back of the blade so as to enhance rotation of the blade during lure retrieval. The combination of the body vanes 980, 982 and the split-tail ends 986, 988 presents visual and audio stimuli to the game fish.

FIG. 68 illustrates the use of first and second blades having a side by side configuration in a spinner blade configuration. During lure retrieval the blades will rotate and intermittently, knock one against the other so as to present visual and audio stimuli to the fish.

FIG. 69 illustrates a lure having a fishlike configuration thereto. The configuration is presented by a chevron 990 fish-head with a blade 101 mounted thereto. The upstream end of the blade 101 has a slight twist thereto and enlarged tails 992, 994 so as to increase rotation during lure retrieval.

Although various embodiments of the invention have been illustrated therein, various modifications may be made to the blade designs may be interchangeable. Thus it is not my intent to limit my invention to the illustrations shown. Accordingly it is understood that the invention is not to be so limited except as set forth in the following claims. It is also understood that various modifications, substitutions and equivalents may be utilized without departing from the spirit of my invention as set forth in the subsequent claims.

Having thus described the invention, what is claimed as new and desired to be secured by letters patent is:

1. An artificial lure for presenting a fish-attracting action upon fishing line retrieval by the fisherman comprising:
    a spinner blade having an upstream end and a downstream end;
    a body section intermediate said blade ends, said body being twisted in a generally symmetrical convolution about an imaginary longitudinal axis passing through said ends;
    an upstream swivel disposed adjacent said upstream end and having said axis passing therethrough;
    means for connecting said upstream swivel to said upstream end;
    a downstream swivel disposed adjacent said downstream end and having said axis passing therethrough;
    means for connecting said downstream swivel to said downstream end;
    means for connecting said downstream swivel to a fishing hook;
    means for connecting said upstream swivel to said fishing line, said fishing lure retrieval causing water to flow over the opposed surfaces of said upstream end through said body section and over the opposed surfaces of said downstream end to rotate said spinner blade about said common axis passing through said swivels and said blade, said swivels cooperating with said ends to maintain said axis passage therethrough and said spinner blade in a generally straight-line rotatable action about said axis following the direction of retrieval of said fishing line, said spiral progressively increases from said upstream end to the middle portion of said body and progressively decreases from said middle portion to said downstream end whereupon said water flow is collected at said middle portion of said blade and is directed by said spiral towards said downstream end.

2. The apparatus as set forth in claim 1 further comprising a plurality of apertures disposed along said blade, whereupon said rotation causes passage of water and/or air through said apertures to present fish-attracting stimuli.

3. The apparatus as set forth in claim 1, wherein said downstream end presents a larger surface area than said surface area of said upstream end, whereby said difference in surface area decreases the rotation of said blade during line retrieval.

4. The apparatus as set forth in claim 3 further comprising a plurality of apertures disposed along said body whereupon said rotation causes passage of water and/or air through said apertures to present fish-attracting stimuli.

5. The apparatus as set forth in claim 1 further comprising first and second tails extending from said downstream end, said tails further extending in opposed directions for grabbing water and air and effecting said stimuli and rotation of said blade during said line retrieval.

6. The apparatus as set forth in claim 1 whereupon said blade is hollow in construction to allow the same to float during a cessation of said line retrieval.

7. The apparatus as set forth in claim 1 further comprising:
a second blade having a configuration approximating the configuration of said first blade;
means for connecting said second blade to said first blade in a nested spaced apart configuration therebetween, whereby water passes through said blades during said line retrieval to present fish-attracting stimuli.

8. The apparatus as set forth in claim 7 wherein said connecting means comprises:
a shaft extending through said blades;
a collar element at the midpoint of said shaft said collar presenting opposed shoulders abutting said blades to separate said blades;
a flange at each end of said shaft end adjacent the exterior of each blade to maintain said extension of said shaft through said blades.

9. The apparatus as set forth in claim 8 wherein said flange is displaced from said shoulder at a distance greater than the thickness of said blade whereby said blade slides along said shaft to present noise stimuli during said blade rotation.

10. The apparatus as set forth in claim 1 further comprising an adjustable fin element extending from at least said downstream end, said fin having water passing thereon during said blade retrieval whereby to effect said blade rotation and said stimuli presented by said rotating blade.

11. The apparatus as set forth in claim 10 wherein said fin is adjustable from a position adjacent said blade and generally flush with said downstream end to a position normal thereto, said position variously effecting said blade rotation and stimuli.

12. The apparatus as set forth in claim 1 further comprising:
at least one tail element extending from said downstream end;
an aperture in said tail;
a rod member having first and second ends; and
means for connecting said first end to said blade with said second end extending through said aperture, whereby said rod vibrates in said aperture during said blade rotation to present a fish-attracting stimuli.

13. The apparatus as set forth in claim 1 further comprising:
a ring element attached to said blade;
a rod member having first and second ends; and
means for connecting said first end to said blade in extension through said ring whereby said rod vibrates in said ring during blade rotation to present a fish-attracting stimuli.

14. The apparatus as set forth in claim 1 further comprising:
an aperture in said body section;
a second spinner blade having first and second ends; and
means for mounting said second spinner blade in said aperture and in rotation with said first blade during said fishing line retrieval to present fish-attracting stimuli.

15. The apparatus as set forth in claim 1 further wherein said spinner blade comprises a plurality of segments, and means for joining said segments in a spaced apart relationship therebetween whereby to present a jointed spinner blade.

16. An artificial lure for presenting a fish-attracting stimuli upon retrieval of a fishing line retrieval connected to said lure comprising:
an elongated tube;
a spinner blade having an upstream end and a downstream end;
a body section intermediate said ends, said body being spirally twisted about a common longitudinal axis passing through said ends;
a wire within said tube having a line anchor for connection of said fishing line thereto;
an upstream swivel;
means for connecting said upstream swivel to said wire;
means for connecting said upstream swivel to said blade disposed in said tube;
a downstream swivel;
means for connecting said downstream swivel to said downstream end of said spinner blade;
a trailer hook; and
means for connecting said hook to said downstream swivel, whereupon said fishing line retrieval directs water through said tube to rotate said blade.

17. An artificial lure for attachment to a fishing line and presenting a fish-attracting stimuli upon fishing line retrieval comprising:
a first spinner blade having an upstream end and a downstream end;
a body section intermediate said ends, said body being spirally twisted about a common longitudinal axis passing through said ends;
a spinner bait wire having one end extending in a generally horizontal relationship and generally aligned with said common axis upon connection of said spinner blade thereto;

a second end on said spinner belt wire below said first end for connection of a hook thereto;

a line anchor on said spinner bait wire for connection of said fishing line thereto;

means for rotatably connecting the upstream end of said blade to said first end of said spinner bait wire, whereupon retrieval of said fishing line rotates said spinner blade to produce fish-attracting stimuli with said horizontal wire generally providing a straight line action to said blade;

said spiral progressively increases from said upstream and to the middle portion of said body and progressively decreases from said middle portion to said downstream end whereupon said water flow is collected at said middle portion of said blade and is directed by said spiral towards said downstream end.

18. The apparatus as set forth in claim 17 further comprising:

a second spinner blade having an upstream end and a downstream end;

means for connecting the upstream end of said second blade to said second end of said wire; and means for connecting said hook to said downstream end of said second blade whereby said second blade rotates during said line retrieval to present further fish-attracting stimuli.

19. The apparatus as set forth in claim 18 wherein said first blade is disposed above said second blade whereby said blades rotate at the surface of the water and below the surface during line retrieval to present a lure having buzz bait and spinner bait modes.

20. The apparatus as set forth in claim 17 further comprising:

a second spinner blade;

means for connecting said upstream end of said second blade to said first end of said spinner bait wire; and means for maintaining said second blade in a position adjacent said first blade whereupon said fishing line retrieval rotates said first and second blades in contact therebetween whereupon to present a fish-attracting stimuli during said line retrieval.

21. The apparatus as set forth in claim 20 further comprising:

at least one tail element extending from said downstream end;

an aperture in said tail;

a rod member having first and second ends; and means for connecting said first end to said blade with said second end extending through said aperture, whereby said rod vibrates in said aperture during said blade rotation to present a fish-attracting stimuli.

22. The apparatus as set forth in claim 17 further comprising a plurality of apertures disposed along said blade, whereupon said rotation causes passage of water and/or air through said apertures to present fish-attracting stimuli.

23. The apparatus is set forth in claim 17, wherein said downstream end presents a larger surface area than said surface area of said upstream end, whereby said difference in surface areas decreases the rotation of said blade during line retrieval.

24. The apparatus as set forth in claim 23, further comprising a plurality of apertures disposed along said body whereupon said rotation causes passage of water and/or air through said apertures to present fish-attracting stimuli.

25. An artificial lure for presenting a fish-attracting action upon fishing line retrieval by the fisherman comprising:

a spinner blade having an upstream end and a downstream end, said blade being hollow in construction to allow the same to float during a cessation of said line retrieval;

a body section intermediate said blade ends, said body being twisted about an imaginary longitudinal axis passing through said ends;

an upstream swivel disposed adjacent said upstream end and having said axis passing therethrough;

means for connecting said upstream swivel to said upstream end;

a downstream swivel disposed adjacent said downstream end and having said axis passing therethrough;

means for connecting said downstream swivel to said downstream end;

means for connecting said downstream swivel to a fishing hook;

means for connecting said upstream swivel to said fishing line, said fishing lure retrieval causing water to flow over the opposed surfaces of said upstream end through said body section and over the opposed surfaces of said downstream end to rotate said spinner blade about said common axis, said swivels cooperating with said ends to maintain said spinner blade in a generally straight-line rotatable action about said axis following the direction of retrieval of said fishing line.

26. The apparatus as set forth in claim 25 further comprising:

a spinner blade having an upstream end and a downstream end;

a body section intermediate said blade ends, said body being twisted about an imaginary longitudinal axis passing through said ends;

an upstream swivel disposed adjacent said upstream end and having said axis passing therethrough;

means for connecting said upstream swivel to said upstream end;

a downstream swivel disposed adjacent said downstream end and having said axis passing therethrough;

means for connecting said downstream swivel to said downstream end;

means for connecting said downstream swivel to a fishing hook;

means for connecting said upstream swivel to said fishing line, said fishing lure retrieval causing water to flow over the upper and lower surfaces of said upstream end through said spiral and over the opposed surfaces of said downstream end to rotate said spinner blade about said axis, said swivels cooperate with said ends to maintain said spinner blade in a generally straight-line rotatable action following the direction of retrieval of said fishing line;

a second blade having a configuration approximating the configuration of said first blade;

means for connecting said second blade to said first blade in a nested spaced apart configuration therebetween, whereby water passes through said blades during said line retrieval to present fish-attracting stimuli and comprising:
- a shaft extending through said blades;
  a collar element at the midpoint of said shaft said collar presenting opposed shoulders abutting said blades to separate said blades;
  a flange at each end of said shaft end adjacent the exterior of each blade to maintain said extension of said shaft through said blades.

27. The apparatus as set forth in claim 26 wherein said flange is displaced from said shoulder at a distance greater than the thickness of said blade whereby said blade slides along said shaft to present noise stimuli during said blade rotation.

28. For use with an artificial lure, a spinner blade having an upstream end and a downstream end for presenting a fish-attracting action upon retrieval of a fishing line attached to said lure comprising:
  said blade being hollow in construction and having a body section intermediate said blade ends, said body being twisted about an imaginary longitudinal axis passing through said ends;
  an upstream swivel disposed adjacent said upstream end and having said axis passing therethrough;
  means for connecting said upstream swivel to said upstream end;
  means for connecting said upstream swivel to said fishing lure, said fishing lure retrieval causing water to flow over the upper and lower surfaces of said upstream end through said spiral and over the opposed surfaces of said downstream end to rotate said spinner blade about said axis, said swivel cooperating with said upstream end to assist rotation of said spinner blade in a fish-attracting action following the direction of retrieval of said fishing lure.

29. For use with an artificial lure, spinner blade having an upstream end and a downstream end for presenting a fish-attracting action upon retrieval of a fishing line attached to said lure comprising:
  a body section intermediate said blade ends, said body being twisted about an imaginary longitudinal axis passing through said ends;
  an upstream swivel disposed adjacent said upstream end and having said axis passing therethrough;
  means for connecting said upstream swivel to said upstream end;
  means for connecting said upstream swivel to said fishing line, said fishing lure retrieval causing water to flow over the upper and lower surfaces of said upstream end through said spiral and over the opposed surfaces of said downstream end to rotate said spinner blade about said axis, said swivel cooperating with said upstream end to assist rotation of said spinner blade in a fish-attracting action following the direction of retrieval of said fishing lure;
  a second blade having a configuration approximating the configuration of said first blade;
  means for connecting said second blade to said first blade in a nested spaced apart configuration therebetween, whereby water passes through said blades during said line retrieval to present fish-attracting stimuli and comprising:
  a shaft extending through said blades;
  a collar element at the midpoint of said shaft said collar presenting opposed shoulders abutting said blades to separate said blades;
  a flange at each end of said shaft end adjacent the exterior of each blade to maintain said extension of said shaft through said blades.

30. The apparatus as set forth in claim 29 wherein said flange is displaced from said shoulder at a distance greater than the thickness of said blade whereby said blade slides along said shaft to present noise stimuli during said blade rotation.

31. An artificial lure for presenting a fish-attracting action upon fishing line retrieval by the fisherman comprising:
  a spinner blade having an upstream end and a downstream end;
  a body section intermediate said blade ends, said body being twisted in a generally symmetrical convolution about an imaginary longitudinal axis passing through said ends;
  an upstream swivel disposed adjacent said upstream end and having said axis passing therethrough;
  means for connecting said upstream swivel to said upstream end;
  a downstream swivel disposed adjacent said downstream end and having said axis passing therethrough;
  means for connecting said downstream swivel to said downstream end;
  means for connecting said downstream swivel to a fishing hook;
  means for connecting said upstream swivel to said fishing line, said fishing lure retrieval causing water to flow over the opposed surfaces of said upstream end through said body section and over the opposed surfaces of said downstream end to rotate said spinner blade about said common axis passing through said swivels and said blade, said swivels cooperating with said ends to maintain said axis passage therethrough and said spinner blade in a generally straight-line rotatable action about said axis following the direction of retrieval of said fishing line,
  said downstream end presents a larger surface area than said surface area of said upstream end, whereby said difference in surface areas decreases the rotation of said blade during line retrieval.

32. The apparatus as set forth in claim 31, further comprising a plurality of apertures disposed along said body whereupon said rotation causes passage of water and/or air through said apertures to present fish-attracting stimuli.

33. An artificial lure for presenting a fish-attracting action upon fishing line retrieval by the fisherman comprising:
  a spinner blade having an upstream end and a downstream end;
  a body section intermediate said blade ends, said body being twisted in a generally symmetrical convolution about an imaginary longitudinal axis passing through said ends;
  an upstream swivel disposed adjacent said upstream end and having said axis passing therethrough;
  means for connecting said upstream swivel to said upstream end;
  a downstream swivel disposed adjacent said downstream end and having said axis passing therethrough;
  means for connecting said downstream swivel to said downstream end;

means for connecting said downstream swivel to a fishing hook;

means for connecting said upstream swivel to said fishing line, said fishing lure retrieval causing water to flow over the upper and lower surfaces of said upstream end through said body section and over the opposed surfaces of said downstream end to rotate said spinner blade about said common axis passing through said swivels and said blade, said swivels cooperating with said ends to maintain said axis passage therethrough and said spinner blade in a generally straight-line rotatable action about said axis following the direction of retrieval of said fishing line, said blade is hollow in construction to allow the same to float during a cessation of said line retrieval.

34. An artificial lure for presenting a fish-attracting action upon fishing line retrieval by the fisherman comprising:

a spinner blade having an upstream end and a downstream end;

a body section intermediate said blade ends, said body being twisted in a generally symmetrical convolution about an imaginary longitudinal axis passing through said ends;

an upstream swivel disposed adjacent said upstream end and having said axis passing therethrough;

means for connecting said upstream swivel to said upstream end;

a downstream swivel disposed adjacent said downstream end and having said axis passing therethrough;

means for connecting said downstream swivel to said downstream end;

means for connecting said downstream swivel to a fishing hook;

means for connecting said upstream swivel to said fishing line, said fishing lure retrieval causing water to flow over the upper and lower surfaces of said upstream end through said body section and over the opposed surfaces of said downstream end to rotate said spinner blade about said common axis passing through said swivels and said blade, said swivels cooperating with said ends to maintain said axis passage therethrough and said spinner blade in a generally straight-line rotatable action about said axis following the direction of retrieval of said fishing line;

a second blade having a configuration approximating the configuration of said first blade;

means for connecting said second blade to said first blade in a nested spaced apart configuration therebetween, whereby water passes through said blades during said line retrieval to present fish-attracting stimuli, wherein said connecting means comprises;

a shaft extending through said blades;

a collar element at the midpoint of said shaft said collar presenting opposed shoulders abutting said blades to separate said blades;

a flange at each end of said shaft end adjacent the exterior of each blade to maintain said extension of said shaft through said blades.

35. The apparatus as set forth in claim 34 wherein said flange is displaced from said shoulder at a distance greater than the thickness of said blade whereby said blade slides along said shaft to present noise stimuli during said blade rotation.

36. An artificial lure for presenting a fish-attracting action upon fishing line retrieval by the fisherman comprising:

a spinner blade having an upstream end and a downstream end;

a body section intermediate said blade ends, said body being twisted in a generally symmetrical convolution about an imaginary longitudinal axis passing through said ends;

an upstream swivel disposed adjacent said upstream end and having said axis passing therethrough;

means for connecting said upstream swivel to said upstream end;

a downstream swivel disposed adjacent said downstream end and having said axis passing therethrough;

means for connecting said downstream swivel to said downstream end;

means for connecting said downstream swivel to a fishing hook;

means for connecting said upstream swivel to said fishing line, said fishing lure retrieval causing water to flow over the opposed surfaces of said upstream end through said body section and over the opposed surfaces of said downstream end to rotate said spinner blade about said common axis passing through said swivels and said blade, said swivels cooperating with said ends to maintain said axis passage therethrough and said spinner blade in a generally straight-line rotatable action about said axis following the direction of retrieval of said fishing line, an adjustable fin element extending from at least said downstream end, said fin having water passing thereon during said blade retrieval whereby to effect said blade rotation and said stimuli presented by said rotating blade.

37. The apparatus as set forth in claim 36 wherein said fin is adjustable from a position adjacent said blade and generally flush with said downstream end to a position normal thereto, said position variously effecting said blade rotation and stimuli.

38. An artificial lure for presenting a fish-attracting action upon fishing line retrieval by the fisherman comprising:

a spinner blade having an upstream end and a downstream end;

a body section intermediate said blade ends, said body being twisted in a generally symmetrical convolution about an imaginary longitudinal axis passing through said ends;

an upstream swivel disposed adjacent said upstream end and having said axis passing therethrough;

means for connecting said upstream swivel to said upstream end;

a downstream swivel disposed adjacent said downstream end and having said axis passing therethrough;

means for connecting said downstream swivel to said downstream end;

means for connecting said downstream swivel to a fishing hook;

means for connecting said upstream swivel to said fishing line, said fishing lure retrieval causing water to flow over the opposed surfaces of said upstream end through said body section and over the opposed surfaces of said downstream end to rotate said spinner blade about said common axis passing through said swivels and said blade, said swivels cooperating with said ends to maintain said axis passage therethrough and said spinner blade in a generally straight-line rotatable action about said axis following the direction of retrieval of said fishing line;

at least one tail element extending from said downstream end;

an aperture in said tail;

a rod member having first and second ends; and means for connecting said first end to said blade with said second end extending through said aperture, whereby said rod vibrates in said aperture during said blade rotation to present a fish-attracting stimuli.

39. An artificial lure for presenting a fish-attracting action upon fishing line retrieval by the fisherman comprising:

a spinner blade having an upstream end and a downstream end;

a body section intermediate said blade ends, said body being twisted in a generally symmetrical convolution about an imaginary longitudinal axis passing through said ends;

an upstream swivel disposed adjacent said upstream end and having said axis passing therethrough;

means for connecting said upstream swivel to said upstream end;

a downstream swivel disposed adjacent said downstream end and having said axis passing therethrough;

means for connecting said downstream swivel to said downstream end;

means for connecting said downstream swivel to a fishing hook;

means for connecting said upstream swivel to said fishing line, said fishing lure retrieval causing water to flow over the opposed surfaces of said upstream end through said body section and over the opposed surfaces of said downstream end to rotate said spinner blade about said common axis passing through said swivels and said blade, said swivels cooperating with said ends to maintain said axis passage therethrough and said spinner blade in a generally straight-line rotatable action about said axis following the direction of retrieval of said fishing line;

a ring element attached to said blade;

a rod member having first and second ends; and means for connecting said first end to said blade in extension through said ring whereby said rod vibrates in said ring during blade rotation to present a fish-attracting stimuli.

40. An artificial lure for presenting a fish-attracting action upon fishing line retrieval by the fisherman comprising:

a spinner blade having an upstream end and a downstream end;

a body section intermediate said blade ends, said body being twisted in a generally symmetrical convolution about an imaginary longitudinal axis passing through said ends;

an upstream swivel disposed adjacent said upstream end and having said axis passing therethrough;

means for connecting said upstream swivel to said upstream end;

a downstream swivel disposed adjacent said downstream end and having said axis passing therethrough;

means for connecting said downstream swivel to said downstream end;

means for connecting said downstream swivel to a fishing hook;

means for connecting said upstream swivel to said fishing line, said fishing lure retrieval causing water to flow over the opposed surfaces of said upstream end through said body section and over the opposed surfaces of said downstream end to rotate said spinner blade about said common axis passing through said swivels and said blade, said swivels cooperating with said ends to maintain said axis passage therethrough and said spinner blade in a generally straight-line rotatable action about said axis following the direction of retrieval of said fishing line, wherein said spinner blade comprises a plurality of segments, and means for joining said segments in a spaced apart relationship therebetween whereby to present a jointed spinner blade.

41. An artificial lure for attaching to a fishing line and presenting a fish-attracting stimuli upon fishing line retrieval comprising:

a first spinner blade having an upstream end and a downstream end;

a body section intermediate said blade ends, said body being spirally twisted about a common longitudinal axis passing through said ends;

a spinner bait wire having one end extending in a generally horizontal relationship and generally aligned with said common axis upon connection of said spinner blade thereto;

a second end on said spinner bait wire below said first end for connection of a hook thereto;

a line anchor on said spinner bait wire for connection of said fishing line thereto; and means for rotatably connecting the upstream end of said blade to said first end of said spinner bait wire, whereupon retrieval of said fishing line rotates said spinner blade to produce fish-attracting stimuli with said horizontal wire generally providing a straight line action to said blades for connection of said blade thereto;

said downstream end presents a larger surface area than said surface area of said upstream and, whereby said difference in surface areas decreases the rotation of said blade during line retrieval.

42. For use with an artificial lure, a spinner blade having an upstream end and a downstream end for presenting a fish-attracting action upon retrieval by the of a fishing line attached to said lure comprising:

a body section intermediate said blade ends, said body being twisted about an imaginary longitudinal axis passing through said ends;

an upstream swivel disposed adjacent said upstream end and having said axis passing therethrough;

means for connecting said upstream swivel to said upstream end;

means for connecting said upstream swivel to said fishing line, said fishing lure retrieval causing water to flow over the upper and lower surfaces of said upstream end through said spiral and over the opposed surfaces of said downstream end to rotate said spinner blade about said axis, said swivel cooperating with said upstream end to assist rotation of said spinner blade in a fish-attracting action following the direction of retrieval of said fishing lure;
said blade is hollow in construction to allow the same to float during a cessation of said line retrieval.

43. For use with an artificial lure, a spinner blade having an upstream end and a downstream end for presenting a fish-attracting action upon retrieval by the of a fishing line attached to said lure comprising:
  a body section intermediate said blade ends, said body being twisted about an imaginary longitudinal axis passing through said ends;
  an upstream swivel disposed adjacent said upstream end and having said axis passing therethrough;
  means for connecting said upstream swivel to said upstream end;
  means for connecting said upstream swivel to said fishing line, said fishing lure retrieval causing water to flow over the upper and lower surfaces of said upstream end through said spiral and over the opposed surfaces of said downstream end to rotate said spinner blade about said axis, said swivel cooperating with said upstream end to assist rotation of said spinner blade in a fish-attracting action following the direction of retrieval of said fishing lure;
  a second blade having a configuration approximating the configuration of said first blade;
  means for connecting said second blade to said first blade in a nested spaced apart configuration therebetween, whereby water passes through said blades during said line retrieval to present fish-attracting stimuli; said connecting means comprises:
  a shaft extending through said blades;
  a collar element at the midpoint of said shaft said collar presenting opposed shoulders abutting said blades to separate said blades;
  a flange at each end of said shaft end adjacent the exterior of each blade to maintain said extension of said shaft through said blades.

44. The apparatus as set forth in claim 13 wherein said flange is displaced from said shoulder at a distance greater than the thickness of said blade whereby said blade slides along said shaft of present noise stimuli during said blade rotation.

45. For use with an artificial lure, a spinner blade having an upstream end and a downstream end for presenting a fish-attracting action upon retrieval by the of a fishing line attached to said lure comprising:
  a body section intermediate said blade ends, said body being twisted about an imaginary longitudinal axis passing through said ends;
  an upstream swivel disposed adjacent said upstream end and having said axis passing therethrough;
  means for connecting said upstream swivel to said upstream end;
  means for connecting said upstream swivel to said fishing line, said fishing lure retrieval causing water to flow over the upper and lower surfaces of said upstream end through said spiral and over the opposed surfaces of said downstream end to rotate said spinner blade about said axis, said swivel cooperating with said upstream end to assist rotation of said spinner blade in a fish-attracting action following the direction of retrieval of said fishing lure; and
  an adjustable fin element extending from at least said downstream end, said fin having water passing thereon during said blade retrieval whereby to effect said blade rotation and said stimuli presented by said rotating blade.

46. The apparatus as set forth in claim 45 wherein said fin is adjustable from a position adjacent said blade and generally flush with said downstream end to a position normal thereto, said position variously effecting said blade rotation and stimuli.

47. For use with an artificial lure, a spinner blade having an upstream end and a downstream end for presenting a fish-attracting action upon retrieval by the of a fishing line attached to said lure comprising:
  a body section intermediate said blade ends, said body being twisted about an imaginary longitudinal axis passing through said ends;
  an upstream swivel disposed adjacent said upstream end and having said axis passing therethrough;
  means for connecting said upstream swivel to said upstream end;
  means for connecting said upstream swivel to said fishing line, said fishing lure retrieval causing water to flow over the upper and lower surfaces of said upstream end through said spiral and over the opposed surfaces of said downstream end to rotate said spinner blade about said axis, said swivel cooperating with said upstream end to assist rotation of said spinner blade in a fish-attracting action following the direction of retrieval of said fishing lure; and
  wherein said spinner blade comprises a plurality of segments, and means for joining said segments in a spaced apart relationship therebetween whereby to present a jointed spinner blade.

48. For use with an artificial lure, a spinner blade having an upstream end and a downstream end for presenting a fish-attracting action upon retrieval by the of a fishing line attached to said lure comprising:
  a body section intermediate said blade ends, said body being twisted about an imaginary longitudinal axis passing through said ends;
  an upstream swivel disposed adjacent said upstream end and having said axis passing therethrough;
  means for connecting said upstream swivel to said upstream end;
  means for connecting said upstream swivel to said fishing lure, said fishing lure retrieval causing water to flow over the upper and lower surfaces of said upstream end through said spiral and over the opposed surfaces of said downstream end to rotate said spinner blade about said axis, said swivel cooperating with said upstream end to assist rotation of said spinner blade in a fish-attracting action following the direction of retrieval of said fishing lure; and
  a notch in said body section, whereby said notch presents a fish-attracting stimuli upon passage through said water during rotation of said blade.

* * * * *